US008584554B2

(12) United States Patent
Chen

(10) Patent No.: US 8,584,554 B2
(45) Date of Patent: Nov. 19, 2013

(54) TORQUE MULTIPLIER

(75) Inventor: Chiang Kao Chen, Taipei Hsien (TW)

(73) Assignee: Legend Lifestyle Products Corp., Taipei (TW)

( * ) Notice: Subject to any disclaimer, the term of this patent is extended or adjusted under 35 U.S.C. 154(b) by 433 days.

(21) Appl. No.: 13/097,331

(22) Filed: Apr. 29, 2011

(65) Prior Publication Data

US 2012/0036970 A1 Feb. 16, 2012

(30) Foreign Application Priority Data

Aug. 12, 2010 (TV) ................................ 99215488 U

(51) Int. Cl.

*B25B 13/00* (2006.01)
*B25B 21/00* (2006.01)
*B25B 17/00* (2006.01)
*B23B 23/00* (2006.01)
*B25B 29/00* (2006.01)
*B25B 13/50* (2006.01)

(52) U.S. Cl.

USPC ....... 81/57.14; 81/57.28; 81/57.29; 81/57.37; 81/57.31; 81/54; 81/57; 81/57.11; 81/57.12; 81/57.13

(58) Field of Classification Search

USPC .......................... 81/52, 54, 57, 57.11–57.14, 81/57.28–57.31, 57.37

See application file for complete search history.

(56) References Cited

U.S. PATENT DOCUMENTS 7,661,335 B2 * 2/2010 Kuboyama ........................ 81/54
7,757,587 B2 * 7/2010 Kaneyama et al. .......... 81/57.14

* cited by examiner

*Primary Examiner* — Monica Carter
*Assistant Examiner* — Danny Hong
(74) *Attorney, Agent, or Firm* — Bacon & Thomas, PLLC

(57) ABSTRACT

A torque multiplier includes a main body, a torque input shaft, at least one torque sensor, an angle sensor, and an information transmission circuit. The main body contains therein at least one gear train. The gear train has upper and lower ends respectively forming a torque input port and a torque output shaft. The torque output shaft is coupleable with a tool piece, such as a socket. The torque input shaft has an end fit into the torque input port and an opposite end coupleable with a torque device, such as a hand tool, an electrical tool, or a pneumatic tool. The torque device applies a torque input to the torque input shaft that in turn rotates the gear train to provide a multiplied torque output to the torque output shaft. The torque sensor is mounted to a surface of the torque output shaft of the gear train of the main body to detect the torque value of the torque output shaft and provide a torque value signal. At least one angle sensor mounted to the main body detects a horizontal angle of the main body and the torque output shaft and provides an angle value signal. The information transmission circuit is arranged inside the main body to transmit, in a wired or wireless fashion, the torque value signal and the angle value signal to at least one electronic device for storage, display or use.

16 Claims, 10 Drawing Sheets

TORQUE MULTIPLIER

BACKGROUND OF THE INVENTION

1. Field of the Invention

The present invention relates to a torque multiplier, and in particular to a torque multiplier that is applicable to torque output of various torque devices and performs detection and transmission of torque value and horizontal angle value in wired or wireless manner to an external electronic device for displaying and application of these values.

2. The Related Arts

A torque multiplier is commonly used in applications where torque based operations are performed in order to provide multiplied torque output through a gear train included in the torque multiplier for power or torque saving for the conventional torque devices, such as hand tools, electrical tools, and pneumatic tools. In a regular operation of a conventional torque multiplier, a threaded fastener, such as a nut, used in a machine or a mechanical part, must be tightened or loosened by following predetermined operation processes with preset levels of torques. However, improper operation of the torque multiplier with a hand tool, an electrical tool, or a pneumatic tool may inadvertently cause damage or breaking of a threaded fastener or a threaded hole, and may thus lead to undesired damage to the functionality and operation precision of the machine. The conventional hand tools, electric tools, or pneumatic tools are not capable of detecting the level of torque applied in an operation, whereby a user cannot get aware of the level of torque applied and must thus depend on his or her experience and discretion to operate the torque multiplier. This may lead to improper application of torque due to human errors.

Further, in the operation of a conventional torque multiplier in combination with a conventional torque tool, such as a hand tool, an electrical tool, and a pneumatic tool, the horizontal angle of operation must be carefully monitored. For example, to tighten a bolt, for safety purposes, an operation manual often describes to which level of torque that the bolt must be tightened with (such as 20 Newton·meter) and how many degrees that the bolt must be horizontally displace to ensure the bolt is properly tightened. Similarly, the data of horizontal angle was not detected and provided in the conventional tools and a skilled operator of torque multiplier must again rely upon his or her experience and visual observation to make adjustment and this does not meet the need for precise and stable operation.

As to other previous patented techniques, examples are shown in Taiwan Utility Model Nos. M275921, M311531, and M318488, all disclosing torque multipliers that include gear trains. However, these torque multipliers, when used in combination with a conventional hand tool, electrical tool, or pneumatic tool, are not capable of detecting torque and horizontal angle for being referenced by a tool operator. There is still the problem of manual error that is caused by improper operation and leads to damage and breaking of bolts or nuts and also, there is no way for an operator to identify if a bolt or nut is properly tightened.

SUMMARY OF THE INVENTION

In the above-discussed known torque multiplier and other prior art devices, these devices provide only a function of multiplying the output torque, and they are not capable of providing torque level and horizontal angle to be referenced by a tool operator, whereby there is still the problem of manual error that is caused by improper operation and leads to damage and breaking of bolts or nuts and also, there is no way for an operator to identify if a bolt or nut is properly tightened.

To overcome the problems and drawbacks of the conventional devices, the present invention provides a torque multiplier, which comprises a main body, a torque input shaft, at least one torque sensor, an angle sensor, and an information transmission circuit. The main body contains therein at least one gear train. The gear train has upper and lower ends respectively forming a torque input port and a torque output shaft. The torque output shat is coupleable with a tool piece, such as a socket. The torque input shaft has an end fit into the torque input port and an opposite end coupleable with a torque device, such as a hand tool, an electrical tool, or a pneumatic tool. The torque device applies a torque input to the torque input shaft that in turn rotates the gear train to provide a multiplied torque output to the torque output shaft. The torque sensor is mounted to a surface of the torque output shaft of the gear train of the main body to detect the torque value of the torque output shaft and provide a torque value signal. At least one angle sensor mounted to the main body detects a horizontal angle of the main body and the torque output shaft and provides an angle value signal. The information transmission circuit is arranged inside the main body to transmit, in a wired or wireless fashion, the torque value signal and the angle value signal to at least one electronic device for storage, display or use.

The effectiveness of the torque multiplier is that the torque sensor is mounted to the torque input shaft to precisely detect the torque value. Further, the angle sensor is mounted to the main body to precisely detect the angle value. Further, these data of the torque value and angle value are transmitted by an information transmission circuit, in a wired or wireless fashion, to an electronic device, such as a personal computer, a notebook computer, a mobile phone, and a personal digital assistant (PDA), for storage, display and use, whereby a user may directly access the data of torque value and angle value obtained in the torque multiplier through a handy electronic device in order to ensure the operation quality of tightening/loosening bolts and nuts.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
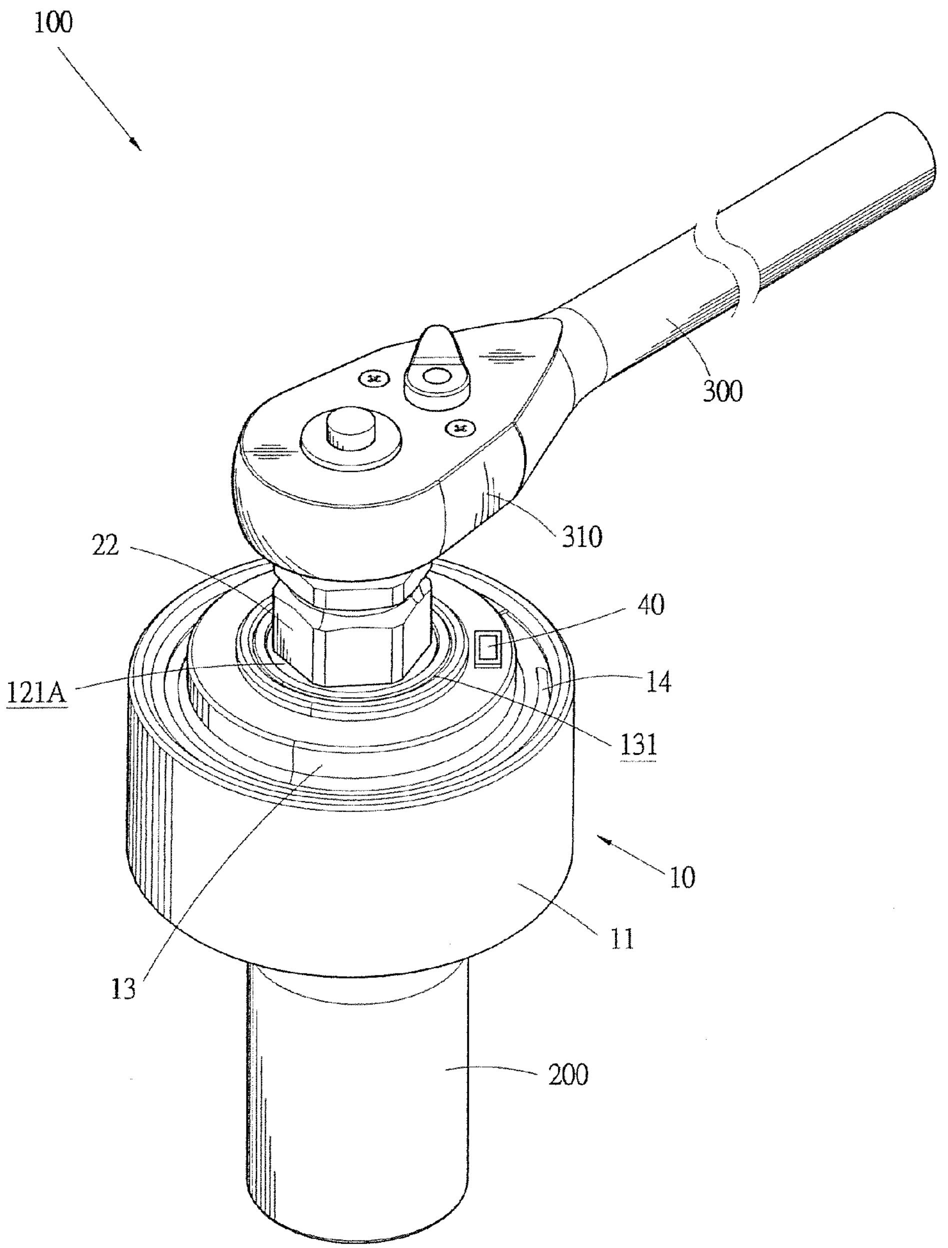
FIG. 1 is a perspective view showing a torque multiplier constructed in accordance with a first embodiment of the present invention.
Figure 2:
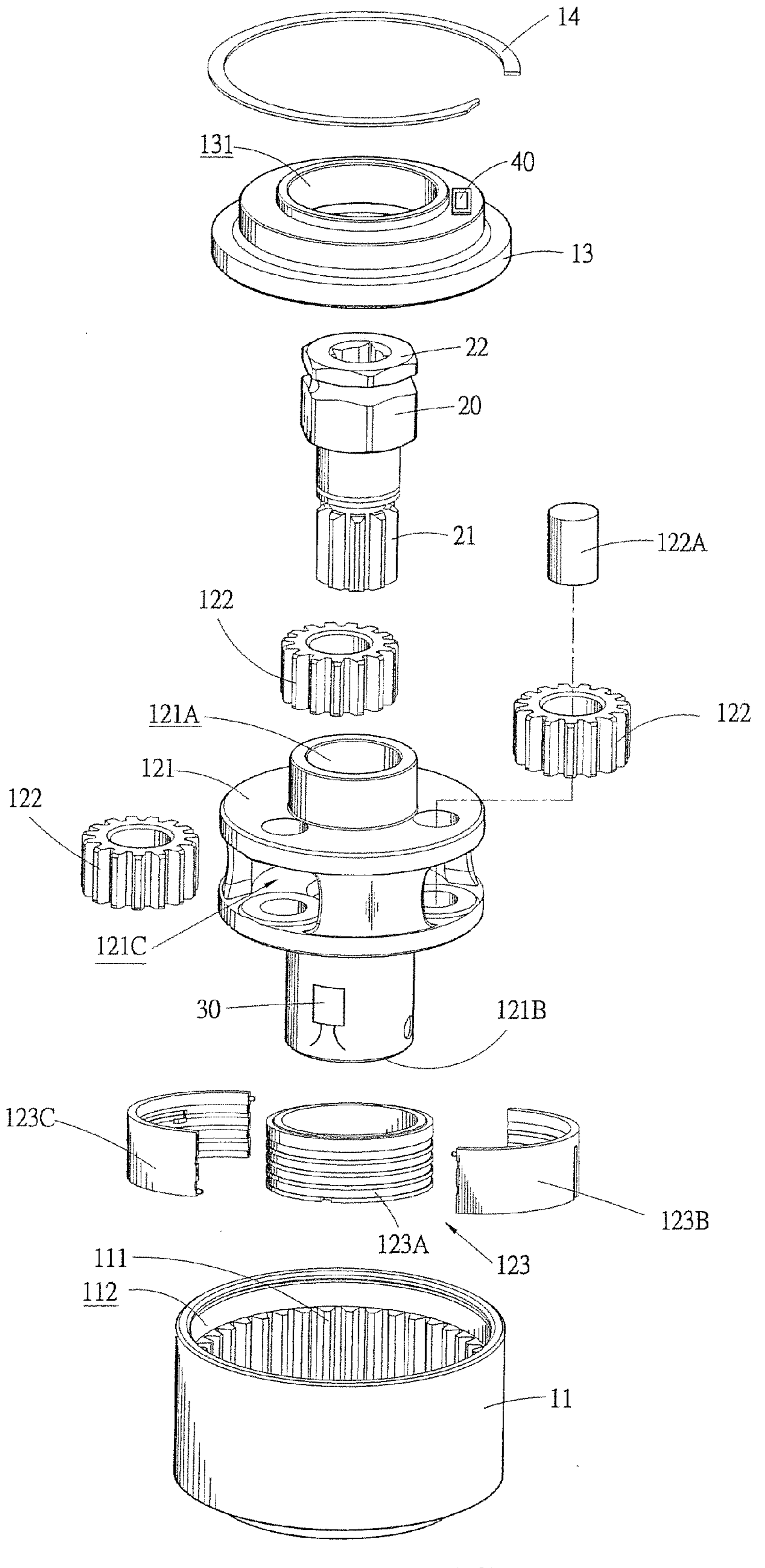
FIG. 2 is an exploded view of FIG. 1.

With reference to the drawings and in particular to FIGS. 1-4, a torque multiplier constructed in accordance with a first embodiment of the present invention is shown at 100. The torque multiplier 100 comprises a main body 10, which comprises a casing 11, a gear train 12, a shaft seat 13, and a C-shaped retention ring 14. The casing 11 has an internal circumferential surface forming a plurality of teeth 111, and the casing 12 encloses and defines a chamber 112.

The gear train 12 is not limited to any specific form and includes, in an example of the present invention, a rotatable disk 121, a plurality of gears 122, and at least one signal pick-up device 123. The rotatable disk 121 is completely received in the chamber 112 of the casing 11. The rotatable disk 121 has an upper end forming a torque input port 121A and a lower end forming a torque output shaft 121B. The torque output shaft 121B is hollow and function's to couple to a tool piece 200, which is not limited to any specific form and may include a socket as an example.

The rotatable disk 121 forms therein a receiving compartment 121C and the gears 122 are received in the receiving compartment 121C and each connected by a shaft 122A between upper and lower ends of the rotatable disk 121 to have the gears 122 engaging the teeth 111 of the internal surface of the casing 11.

Figure 3:
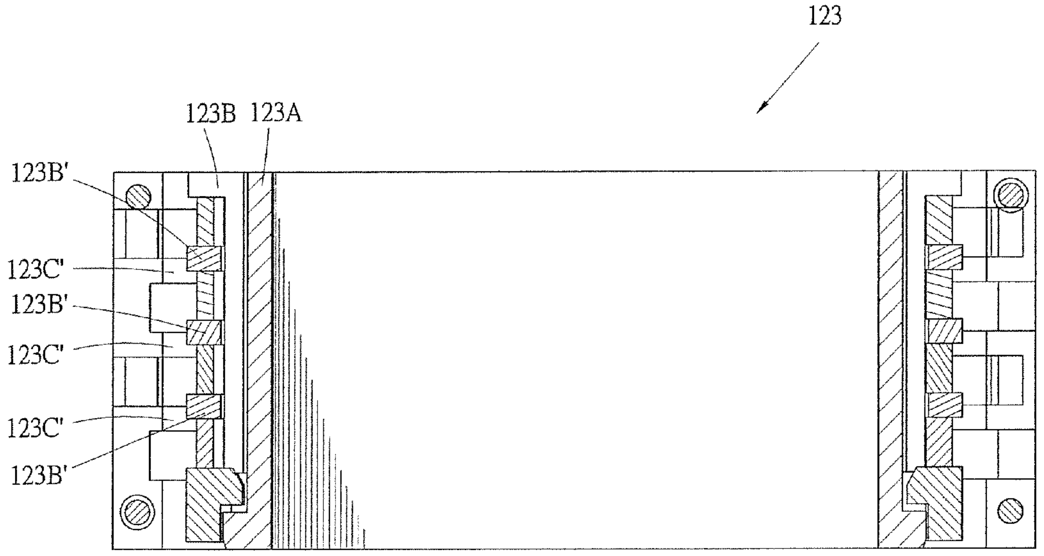
FIG. 3 is a cross-sectional view showing a signal pick-up device of the torque multiplier of the present invention.

The signal pick-up device 123 is arranged outside and coupled to the torque output shaft 121B. The signal pick-up device 123 is not limited to any specific form and, in an example of the present invention, the signal pick-up device 123 comprises an inner ring 123A, an intermediate ring 123B, and an outer ring 123C. The inner ring 123A is coupled to and rotatable in unison with the torque output shaft 121B. The intermediate ring 123B is arranged outside the inner ring 123A and an outside surface of the intermediate ring 123B is provided with contact conductors 123B'. The outer ring 123C is fit outside the Intermediate ring 123B and has an inside surface that is provided with a plurality of signal coupling conductors 123C'. The signal coupling conductors 123C' correspond to and are engageable with the contact conductors 123B' on the outside surface of the intermediate ring 123B (as shown in FIG. 3), whereby when the inner ring 123A is rotated with the torque output shaft 121B, the contact conductors 123B' of the intermediate ring 123B may maintain constant engagement with the signal coupling conductors 123C' of the outer ring 123C.

The shaft seat 13 forms a central bore 131, which is fit outside the torque input port 121A of the rotatable disk 121 of the gear train 12 to close the top end of the casing 11.

The C-shaped retention ring 14 is fit between an outer circumference of the shaft seat 13 and the top of the casing 11 so that the C-shaped retention ring 14 fixes the shaft seat 13 to the top of the casing 11.

At least one torque input shaft 20 is received in and coupled to the torque input port 121A of the gear train 12 of the main body 10. The torque input shaft 20 has an end portion of which a circumferential surface forms a plurality of teeth 21. The teeth 21 are mateable with the gears 122 received in the rotatable disk 121 of the gear train 12 of the main body 10. The torque input shaft 20 has an opposite end forming a coupling end 22 that is exposed outside the top of the main body 10 for coupling with a tool connector 310 formed at an end of a torque device 300. The torque device 300 is not limited to any specific form and a torque spanner is taken as an example in the present invention, but it is apparent that other torque devices, such as an electrical torque devices or pneumatic torque devices, are also considered within the scope of the present invention. The torque device 300 is operated to rotate the torque input shaft 20 and thus applies a torque input to the torque input shaft 20. The torque input shaft 20 then drives the gears 122 of the gear train 12 to have the gears 122 rotating along the teeth 111 formed on the internal circumferential surface of the casing 11. This in turn causes the gear train 12 to rotate and the torque output shaft 121B is caused to simultaneously rotate in such a way that the torque output by the torque output shaft 121B is multiplied.

Figure 4:
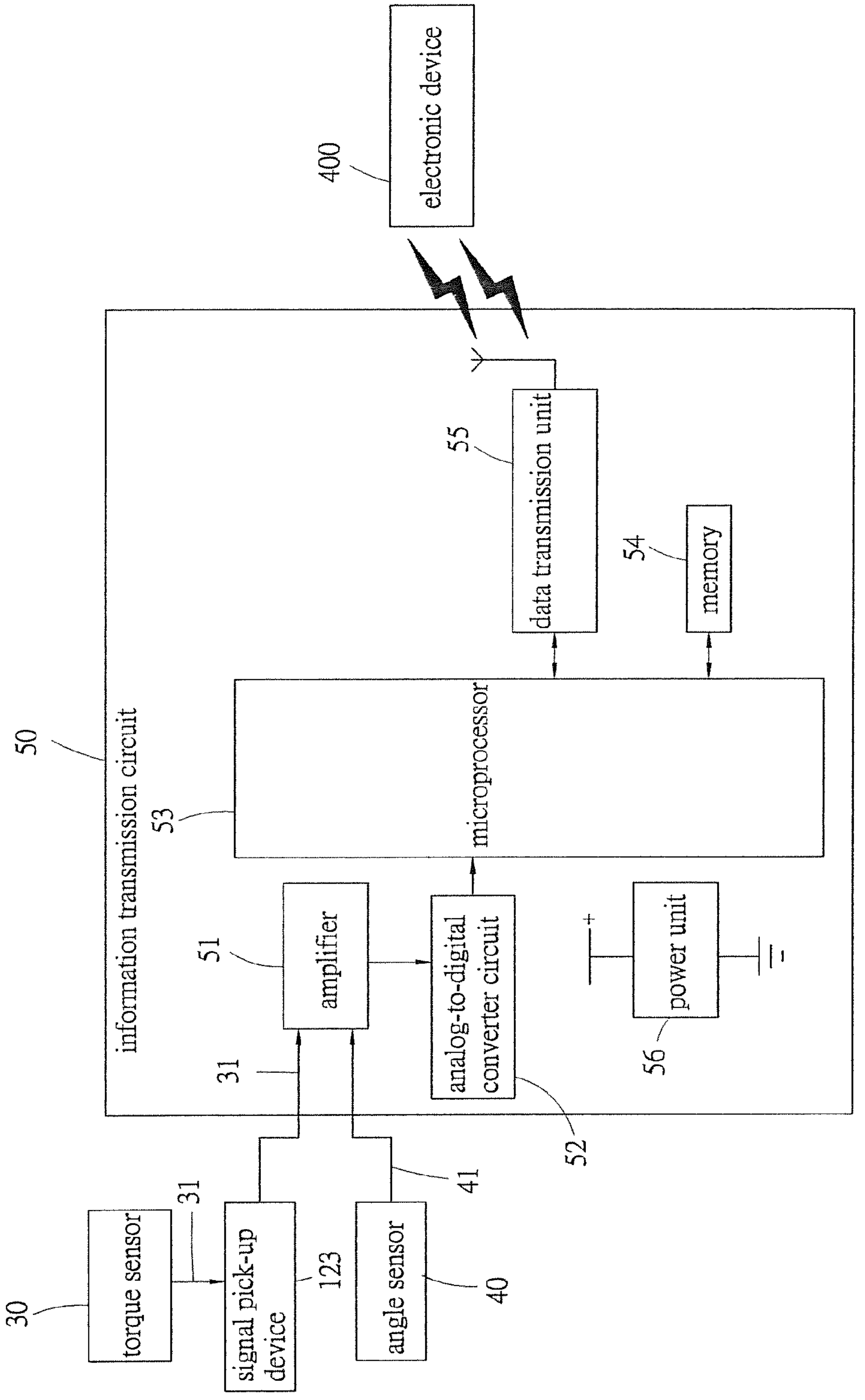
FIG. 4 is a block diagram of an information transmission circuit of the torque multiplier of the present invention.
Figure 5:
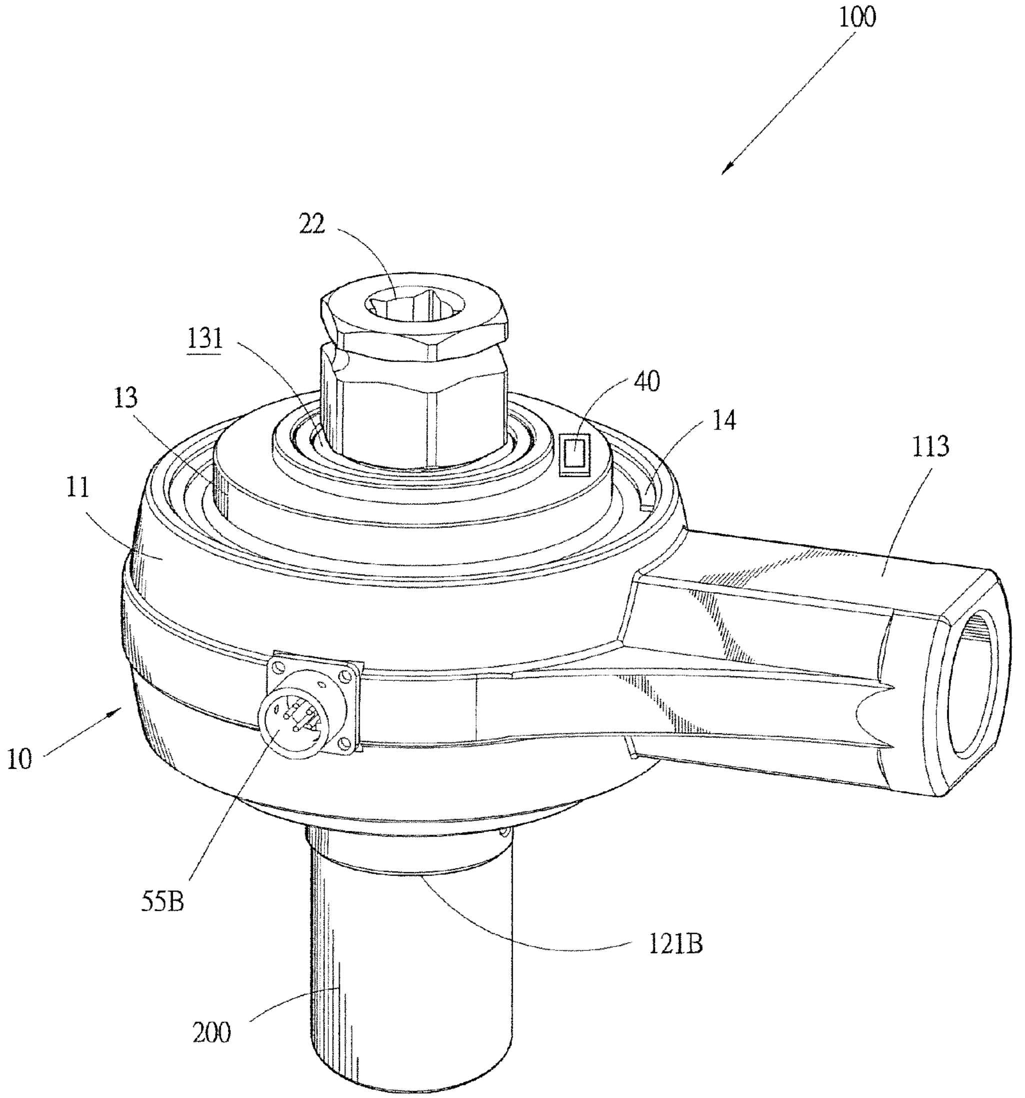
FIG. 5 is a perspective view showing a torque multiplier constructed in accordance with a second embodiment of the present invention.
Figure 6:
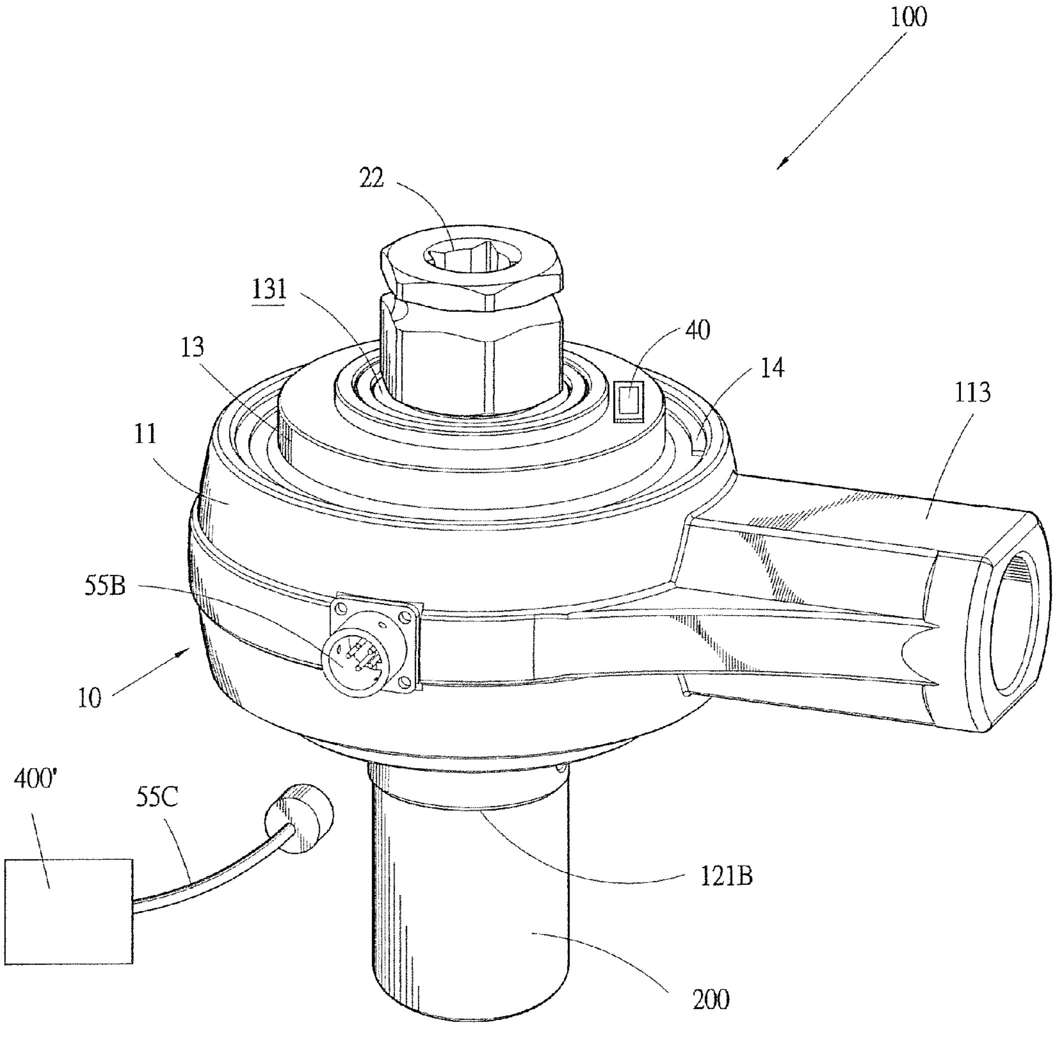
FIG. 6 is an exploded view of FIG. 5.

At least one torque sensor 30 is mounted to a surface of Torque output shaft 121B on the lower end of the rotatable disk 121 to detect a torque input of the torque output shaft 121B and provides a torque value signal 31 (see FIG. 4). The torque sensor 30 is connected to each of the contact conductors 123B' of the intermediate ring 123B of the signal pick-up device 123 so that the torque value signal 31 is transmitted through the signal coupling conductors 123C' of the outer ring 123C that are in contact engagement with the contact conductors 123B'.

At least one angle sensor 40 is mounted to a surface of the main body 10 to detect a horizontal angle of the main body 10 and the torque device 300 and provides an angle value signal 41. The angle sensor 40 is not limited to any specific form and a gyro integrated circuit bearing a model number ISZ-650 of Invensense series available from Macnica Taiwan Limited is taken as an example herein.

Referring to FIG. 4, an information transmission circuit 50 is arranged inside the main body 10. The information transmission circuit 50 is connected to the contact conductors 123B' of the intermediate ring 123B of the signal pick-up device 123 and the angle sensor 40 to receive and convert the torque value signal 31 and the angle value signal 41 into data that are transmittable in a wired or wireless fashion to an electronic device 400. In the embodiment illustrated in FIG. 4, the data of torque and horizontal angle obtained from the torque value signal 31 and the angle value signal 41 being transmitted in a wireless fashion is taken as an example. The electronic device 400 can be electronic equipment that is capable of receiving, storing, displaying or using data, such as a personal computer, a notebook computer, a mobile phone, and a personal digital assistant. In the embodiment, a mobile phone is taken as an example.

The information transmission circuit 50 is not limited to any specific form and in an embodiment of the present invention, the information transmission circuit 50 comprises at least one amplifier 51, an analog-to-digital converter circuit 52, a microprocessor 53, a memory 54, a data transmission unit 55, and a power unit 56. The amplifier 51 is connected to the signal coupling conductors 123C' of the outer ring 123C of the signal pick-up device 123 and the angle sensor 40 to receive and amplify the torque value signal 31 and the angle value signal 41. The analog-to-digital converter circuit 52 is connected to the amplifier 51 to convert the amplified torque value signal 31 and angle value signal 41 into digital torque and angle data for output. The microprocessor 53 is connected to the analog-to-digital converter circuit 52 to receive the torque and angle data from the analog-to-digital converter circuit 52. The microprocessor 53 provides the operational functions of conversion and data transmission for the torque and angle values, setting of threshold torque value, alarming and storage of torque and angle values.

The memory 54 is connected to the microprocessor 53. The memory 54 provides the function of temporary storage of the torque value, the angle value, a predetermined torque threshold, and a predetermined angle threshold.

The data transmission unit 55 is connected to the microprocessor 53 for transmission of the data of torque value and angle value. The data transmission unit 55 is not limited to any specific form and in the first embodiment of the present invention, a wireless transmission interface is taken as an example for transmission of data of torque value and angle value to the electronic device 400 for temporary storage, display, or use. The wireless transmission taken by the data transmission unit 55 is not limited to any specific mode and in an embodiment of the present invention, radio frequency (RF) transmission is taken as an example. Other modes of wireless transmission and reception, such as wireless USB (Universal Serial Bus), Blue Tooth, wireless local area network (WLAN), infrared (IR), amplitude shift keying (ASK) or frequency shift keying (FSK), are deemed within the scope of the present invention.

The power unit 56 is not limited to any specific form, and in an embodiment of the present invention, a direct current (DC) battery is taken as an example, but other equivalent power supply device, such as AC/DC rectifier, is considered within the scope of the present invention. The power unit 56 supplies a DC working power to the torque sensor 30, the angle sensor 40, the amplifier 51, the analog-to-digital converter circuit 52, the microprocessor 53, the memory 54, and data transmission unit 55.

Referring to FIGS. 5-8, a torque multiplier constructed in accordance with a second embodiment of the present invention is shown, and is also designated with reference numeral 100 for simplicity. The casing 11 of the main body 10 is provided externally with a connection bar 113. An assisting arm 114 has an end forming a connection opening 114A that is fit to the connection bar 113 and an opposite end forming an assisting board 114B. The assisting board 114B is positionable on a surface of a component 510 of an article 500 to be tightened (see FIG. 7). The articles 500 to be tightened and the component 510 thereof are not limited to any specific forms and in an embodiment of the present invention, a tire is taken as an example of the article 500 to be tightened, and the component 510 is a nut. In this arrangement, a torque device 300 that is combined with the torque multiplier 100 of the present invention can be supported by the assisting arm is the operation thereof so that the torque multiplier 100 will not get sliding off during the operation thereof.

Figure 8:
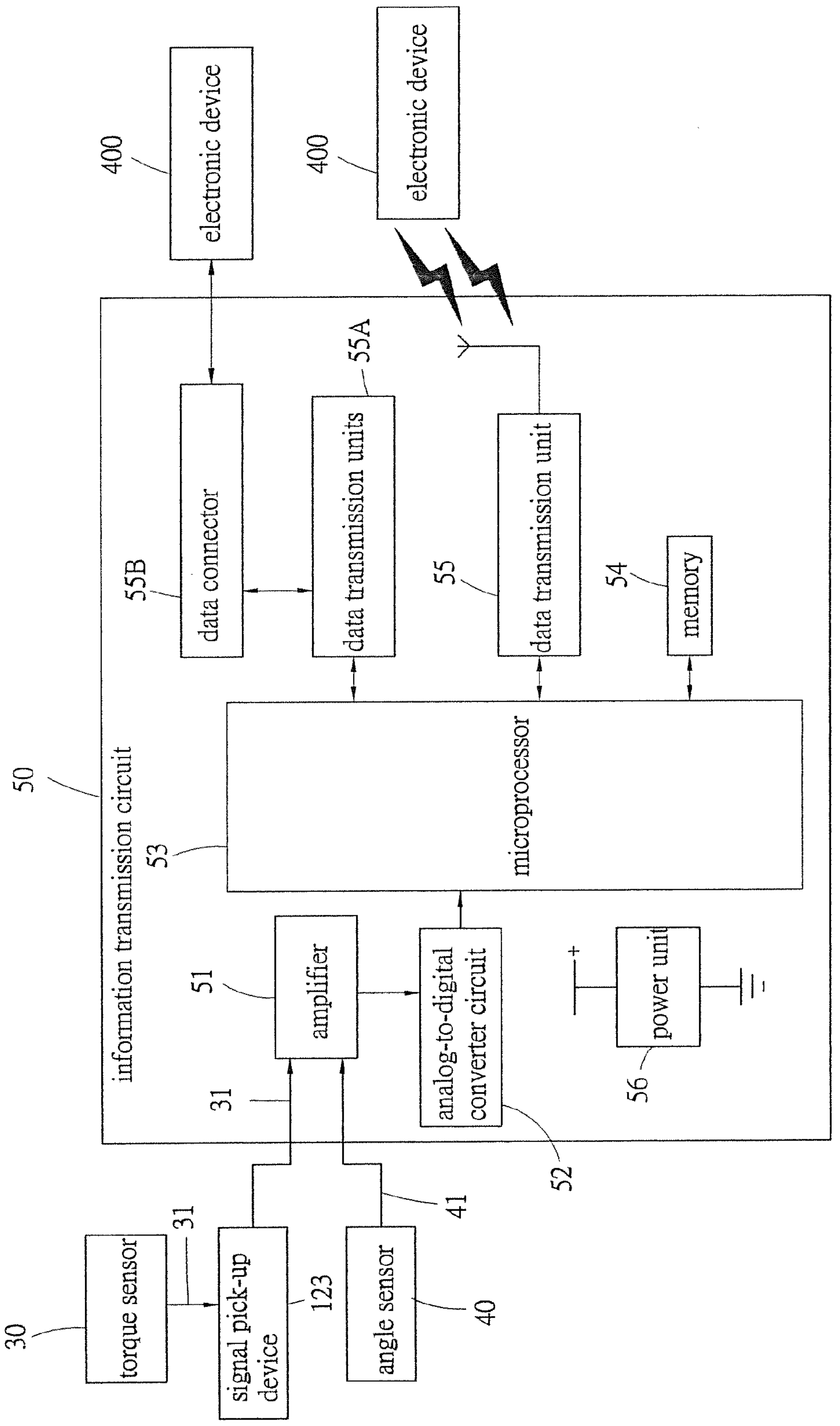
FIG. 8 is a block diagram of an information transmission circuit of the torque multiplier shown in FIG. 5.

Further, the microprocessor 53 of the information transmission circuit 50 is connected to two data transmission units 55, 55A (see FIG. 8). The data transmission unit 55 is a wireless data transmission interface, while the data transmission unit 55A is a data display transmission interface. The data transmission unit 55A is connected to a data connector 55B, which can be set at any desired position, and in an embodiment of the present invention, the data connector 55B is mounted to a circumference of the casing 11 as an example for connecting by a data cable 55C to the electronic device 400' (see FIG. 8). The electronic device 400' is a display device that makes timely display of the torque value and the angle value. The data transmission unit 55A is not limited to connection with a display based electronic device 400' and other electronic equipment, such as a personal computer, a notebook computer, a mobile phone, and a personal digital assistant that functions to receive, store, display or use data, is considered within the scope of the present invention.

Figure 9:
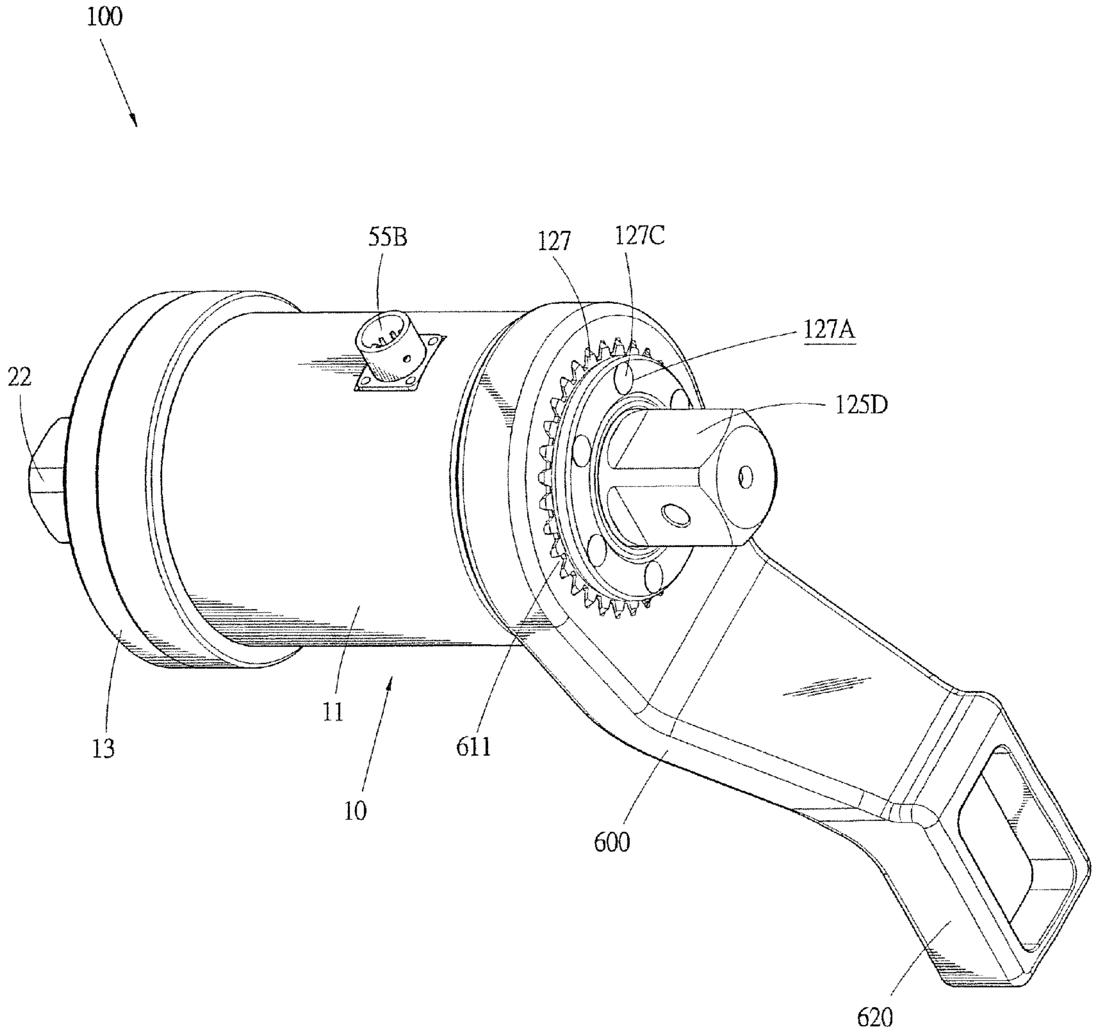
FIG. 9 is a perspective view showing a torque multiplier constructed in accordance with a third embodiment of the present invention.
Figure 10:
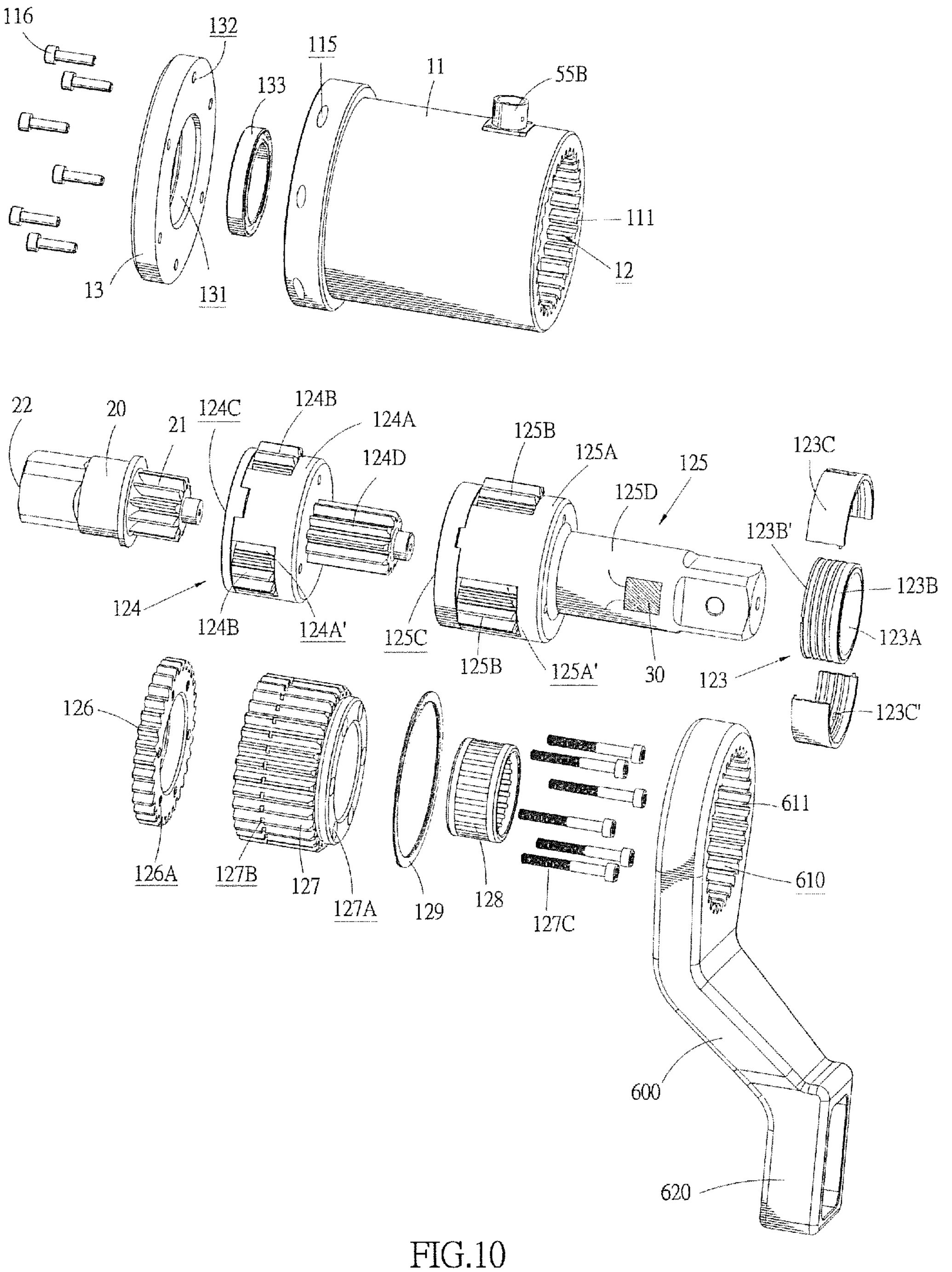
FIG. 10 is an exploded view of FIG. 9.

Referring to FIGS. 9 and 10, a torque multiplier constructed in accordance with a third embodiment of the present invention is shown. The shaft seat 13 forms a plurality of through holes 132. The top of the casing 11 forms a plurality of threaded holes 115 that correspond to the through holes 132 and receive bolts 116 to extend therethrough and engage therewith to secure the shaft seat 13 and the casing 11 together. The central bore 131 of the shaft seat 13 receives a bearing 133 therein. The gear train 12 comprises a primary gear train 125 and a secondary gear train 124, a first ring gear 126, a second ring gear 127, a bearing 128, a C-shaped retention ring 129, and a signal pick-up device 123. The secondary gear train 124 comprises a rotatable disk 124A and a plurality of gears 124B. The rotatable disk 124A forms therein a receiving compartment 124A' that receives the gears 124B to each rotatably connected between upper and lower ends of the rotatable disk 124A. The upper and lower ends of the rotatable disk 124A respectively form a coupling opening 124C and an output gear 124D. The coupling opening 124C receives the end of the torque input shaft 20 that forms the teeth 21 to fit therein to allow the teeth 21 to engage the gears 124B, while the gears 124B are also set in engagement with the teeth 111 of the casing 11.

The primary gear train 125 comprises a rotatable disk 125A and a plurality of gears 125B. The rotatable disk 125A forms therein a receiving compartment 125A' that receives the gears 125 to each rotatably connected between upper and lower ends of the rotatable disk 125. The upper and lower ends of the rotatable disk 125 respectively form a power input coupling opening 125C and a torque output shaft 125D. The power input coupling opening 125C receives the output gear 124D of the secondary gear train 124 to fit therein to allow the output gear 124D to engage the gears 125B, while the gears 125B are also set in engagement with the teeth 111 of the casing 11. The torque output shaft 125D comprises the torque sensor 30 mounted thereon.

The first ring gear 126, the second ring gear 127, the bearing 128, and the signal pick-up device 123 are respectively fit over the torque output shaft 125D. The first ring gear 126 has a surface forming a plurality of threaded holes 126A. The second ring gear 127 has a circumferential portion forming a plurality of elongate holes 127A. The second ring gear 127 forms a plurality of connection notches 127B in a lower circumferential surface thereof. The threaded holes 126A correspond to the elongate holes 127A and receive bolts 127C to extend therethrough and engage therewith to secure the first ring gear 126 to the second ring gear 127.

The C-shaped retention ring 129 is fit in the connection notches 127B of the second ring gear 127 to have a portion of the second ring gear 127 retained inside the chamber 112 of the casing 11 and a remaining portion of the second ring gear 127 exposed outside the casing 11.

Figure 7:
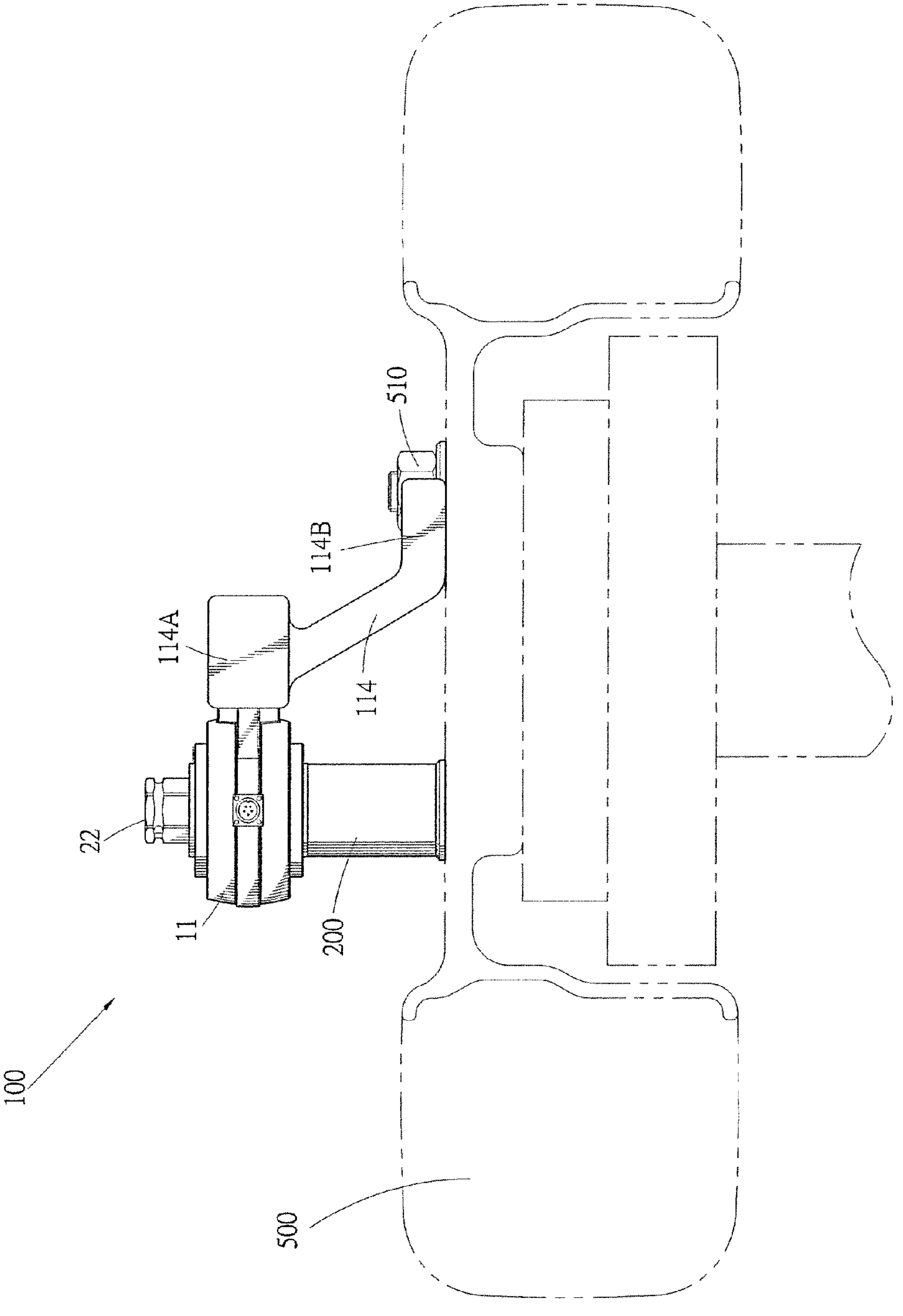
FIG. 7 is a side elevational view illustrating the torque multiplier of the present invention used to tighten a tire.

An assisting arm 600 has an end forming a connection opening 610 and an opposite end forming an assisting board 620. The connection opening 610 forms in an internal circumferential surface a plurality of teeth 611. The connection opening 610 is fit over the portion of the second ring gear 127 that is exposed outside the casing 11 so that the teeth 610 engage partly the second ring gear 127. The assisting board 620 provides a function, as shown in FIG. 7, for assisting support on a surface of a component 510 of an article 500 to be tightened.

In practical operation of the torque multiplier 100 shown in FIGS. 9 and 10, a torque device 300 applies a torque input to the torque input shaft 20, which rotates the secondary gear train 124 and the output gear 124D is caused to drive the primary gear train 125 so that the torque output shaft 125D of the primary gear train 125 provides a torque output that is multiplied by the secondary gear train 124 and the primary gear train 125. Also, the assisting arm 600 provides an assisting support to prevent the torque multiplier 100 from sliding off during the operation thereof.

The torque multipliers as described above with reference to FIGS. 1-10 provide illustrative examples of the technical solution and measures taken by the present invention and it is noted that the idea of the present invention can be embodied in different forms and is not limited to the description given above. Thus, although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A torque multiplier, comprising:

a main body, which comprises therein at least one gear train, the gear train having upper and lower ends respectively forming a torque input port and a torque output shaft that is adapted to connect a tool piece;

at least one torque input shaft, which is received in the torque input port of the main body, the torque input shaft having an end portion of which a circumferential surface forms a plurality of teeth, the teeth mateable with the gear train located in the main body, the torque input shaft having an opposite end forming a coupling end that is adapted to couple with a tool connector formed at an end of a torque device in order to allow the torque device to rotate the torque input shaft and applies a torque input to the torque input shaft for rotating the gear train contained in the main body and providing a multiplied torque output to the torque output shaft;

at least one torque sensor, which is mounted to a surface of the torque output shaft on the lower end of the gear train of the main body to detect the torque input of the torque input shaft and provides a torque value signal;

at least one angle sensor, which is mounted to a surface of the main body to detect a horizontal angle of the main body and the torque device and provide an angle value signal; and at least one information transmission circuit, which is received in the main body, the information transmission circuit converting the torque value signal of the torque sensor and the angle value signal of the angle sensor into data and adapted to transmit the data to an electronic device.

2. The torque multiplier as claimed in claim 1, wherein the main body comprises:

a casing, which has an internal circumferential surface forming a plurality of teeth, the casing enclosing and defining a chamber;

a gear train, which is received in the chamber of the casing, the gear train engaging the teeth on the internal circumferential surface of the casing, the gear train having upper and lower ends respectively forming the torque input port and the torque output shaft;

a shaft seat, which forms a central bore, which is fit outside the torque input port of the rotatable disk of the gear train to close the top end of the casing; and a C-shaped retention ring, which is fit between an outer circumference of the shaft seat and the top of the casing so that the C-shaped retention ring fixes the shaft seat to the top of the casing.

3. The torque multiplier as claimed in claim 2, wherein the casing of the main body is provided externally with a connection bar.

4. The torque multiplier as claimed in claim 3, wherein the connection bar is connected to an assisting arm.

5. The torque multiplier as claimed in claim 4, wherein the assisting arm has an end forming a connection opening that is fit to the connection bar and an opposite end forming an assisting board.

6. The torque multiplier as claimed in claim 2, wherein the gear train comprises:

a rotatable disk, which is received in the chamber of the casing, the rotatable disk forming therein a receiving compartment, the rotatable disk having an upper end forming the power input port and a lower end forming the torque output shaft, the torque output shaft being hollow and adapted to couple to a tool piece;

a plurality of gears, which is received in the receiving compartment of the rotatable disk and rotatably connected between the upper and lower ends of the rotatable disk to have the gears mateable with the teeth of the internal circumferential surface of the casing; and a signal pick-up device, which is arranged inside the hollow torque output shaft.

7. The torque multiplier as claimed in claim 6, wherein the signal pick-up device comprises:

an inner ring, which is coupled to and rotatable in unison with the torque output shaft;

an intermediate ring, which is arranged outside the inner ring, an outside surface of the intermediate ring being is provided with contact conductors; and an outer ring, which is fit outside the intermediate ring and has an inside surface that is provided with a plurality of signal coupling conductors, the signal coupling conductors corresponding to and engageable with the contact conductors on the outside surface of the intermediate ring, whereby when the inner ring is rotated with the torque output shaft, the contact conductors of the intermediate ring may maintain constant engagement with the signal coupling conductors of the outer ring.

8. The torque multiplier as claimed in claim 2, wherein the gear train comprises:

a secondary gear train, which comprises a rotatable disk and a plurality of gears, the rotatable disk forming a receiving compartment that receive the gears rotatably connected between upper and lower ends of the rotatable disk, the upper and lower ends of the rotatable disk respectively forming a coupling opening and an output gear, the coupling opening receiving the end of the torque input shaft that forms the teeth to fit therein to allow the teeth to engage the gears, while the gears are also set in engagement with the teeth of the casing;

a primary gear train, which comprises a rotatable disk and a plurality of gears, the rotatable disk forming therein a receiving compartment that receives the gears rotatably connected between upper and lower ends of the rotatable disk, the upper and lower ends of the rotatable disk respectively forming a power input coupling opening and a torque output shaft, the power input coupling opening receiving the output gear of the secondary gear train to fit therein to allow the output gear to engage the gears, while the gears are also set in engagement with the teeth of the casing;

a first ring gear, a second ring gear, a bearing, and a signal pick-up device, which are respectively fit over the torque output shaft, the first ring gear having a surface forming a plurality of threaded holes, the second ring gear having a circumferential portion forming a plurality of elongate holes, the second ring gear forming a plurality of connection notches in a lower circumferential surface thereof, the threaded holes corresponding to the elongate holes and receiving bolts to extend therethrough and engage therewith to secure the first ring gear to the second ring gear; and a C-shaped retention ring, which is fit in the connection notches of the second ring gear to have a portion of the second ring gear retained inside the chamber of the casing and a remaining portion of the second ring gear exposed outside the casing.

9. The torque multiplier as claimed in claim 8, wherein the second ring gear is coupled to an assisting arm.

10. The torque multiplier as claimed in claim 9, wherein the assisting arm has an end forming a connection opening and an opposite end forming an assisting board, the connection opening forming in an internal circumferential surface a plurality of teeth that engage the second ring gear.

11. The torque multiplier as claimed in claim 1, wherein the angle sensor comprises a gyro integrated circuit.

12. The torque multiplier as claimed in claim 1, wherein the information transmission circuit comprises:

at least one amplifier, which is connected to the torque value signal of the torque sensor and the angle value signal of the angle sensor to amplify the torque value signal and the angle value signal;

at least one analog-to-digital converter circuit, which is connected to the amplifier to convert the torque value signal and the angle value signal that are amplified by the amplifier into digital data of torque value and angle value;

at least one microprocessor, which is connected to the analog-to-digital converter circuit to receive the digital data of torque value and angle value from the analog-to-digital converter circuit, the microprocessor providing functions of conversion of the torque and angle values and transmission of data;

at least one memory, which is connected to the microprocessor to provide a function of temporary storage of the torque value, the angle value, a predetermined torque threshold, and a predetermined angle threshold;

at least one data transmission unit, which is connected to the microprocessor for transmission of the data of torque value and angle value; and at least one power unit, which supplies working power to the torque sensor, the angle sensor, the amplifier, the analog-to-digital converter circuit, the microprocessor, the memory, and the data transmission unit.

13. The torque multiplier as claimed in claim 12, wherein the data transmission unit comprises a wireless transmission interface.

14. The torque multiplier as claimed in claim 12, wherein the data transmission unit comprises a data display transmission interface.

15. The torque multiplier as claimed in claim 12, wherein the data transmission unit is connected to a data connector.

16. The torque multiplier as claimed in claim 15, wherein the data transmission unit is connected through a data cable to a display device.

* * * * *